United States Patent [19]

Mohsin

[11] Patent Number: 4,629,395

[45] Date of Patent: Dec. 16, 1986

[54] FLUID-POWERED ROTARY MOTOR

[75] Inventor: Mohamed E. Mohsin, Alkrington, England

[73] Assignee: National Research Development Corp., London, England

[21] Appl. No.: 612,124

[22] Filed: May 21, 1984

[30] Foreign Application Priority Data

May 25, 1983 [GB] United Kingdom ............... 8314522

[51] Int. Cl.$^4$ .............................................. F01D 1/18
[52] U.S. Cl. ........................................ 415/75; 415/90
[58] Field of Search ................ 415/71, 75, 76, 90, 415/72–74, 92, 202

[56] References Cited

U.S. PATENT DOCUMENTS

| | | | |
|---|---|---|---|
| 1,031,834 | 7/1912 | Brazelle | 415/90 |
| 2,777,394 | 1/1957 | Modrovsky et al. | 415/90 |
| 2,969,020 | 1/1961 | Fazekas | 415/90 |
| 3,324,970 | 6/1967 | McHugh | 415/90 UX |
| 3,650,632 | 3/1972 | Shanahan | 415/90 |
| 3,751,908 | 8/1973 | Colwell et al. | 415/90 X |
| 3,794,447 | 2/1974 | Bullough | 415/90 X |
| 4,027,995 | 6/1977 | Berry | 415/92 |
| 4,218,176 | 8/1980 | Gawne | 415/90 |
| 4,218,177 | 8/1980 | Robel | 415/90 |
| 4,280,791 | 7/1981 | Gawne | 415/90 |
| 4,378,195 | 3/1983 | Gamell | 415/90 |

FOREIGN PATENT DOCUMENTS

| | | |
|---|---|---|
| 1265732 | 5/1961 | France ............................. 415/90 |
| 882250 | 11/1961 | United Kingdom . |
| 2021705 | 12/1979 | United Kingdom . |
| 2087985 | 6/1982 | United Kingdom . |

Primary Examiner—Robert E. Garrett
Assistant Examiner—Joseph M. Pitko
Attorney, Agent, or Firm—Cushman, Darby & Cushman

[57] ABSTRACT

A fluid-powered rotary motor, and method of operating the same. Pressured fluid is introduced to the annular clearance between a rotor and a second member, and reaches an outlet by travelling circumferentially within that clearance. The direction of motion of the fluid on entering the clearance is substantially tangential relative to the rotor, so as to avoid any substantial jet impingement of the fluid upon the rotor, and so that the rotor is driven substantially wholly by the hydrodynamic viscous drag action of the fluid upon it. Methods of profiling the rotor surface are disclosed which enhance the surface area over which the viscous drag action can be effected.

1 Claim, 6 Drawing Figures

FLUID-POWERED ROTARY MOTOR

This invention relates to fluid-powered motors, and to a method of operating them that is different from that employed in turbines, by which we mean fluid-powered rotary motors in which the power is produced by change of momentum as a result of change of direction of the fluid when it meets the rotor.

In the equally different technical field of hydrostatic rotary bearings, the purpose of which is to support a rotor rather than drive it, some recent proposals are however pertinent to the history of the present invention. Published patent application GB No. 2087985A describes a rotor to run with small radial clearance within a cylindrical cavity formed in a stator. A plurality of recesses of "pads", each connected to a supply of fluid under pressure, are formed at circumferential intervals around the wall of the cavity. Either within each pad or exterior to it, channelling structures are provided to ensure that the circulatory motion, set up in the fluid within each pad by reason of contact between that fluid and the moving rotor, avoids direct contact between streams of fluid moving in opposite directions: at the high speeds of rotation at which many hydrostatic journal bearings work, such contact generates much heat, and generally increases the resistance which the bearing offers to the spinning of the rotor. The invention of Application No. 2087985A involves forming the channelling structure in such a way that in addition to avoiding heat generation in the manner just described a negative pressure gradient is set up within each pad. As the specification of No. 2087985A explains, in known hydrostatic bearings of this kind relative motion of the rotor and stator in use tends to set up a positive pressure gradient within each pad. That is to say, the pressure of the fluid within that pad tends to rise continuously from a minimum value close to the leading end of the pad to a maximum value close to the trailing end. By the leading end of the pad we mean that circumferential end of the pad which a given point on the surface of the rotor crosses first as it passes across the mouth of the pad; by the trailing end we mean the opposite circumferential end. A consequence of such a pressure distribution is a high value of the shear resistance experienced by the fluid within the pad at its interface with the rotor, and thus in a relatively high total resistance that must be overcome to maintain the two members of the bearing in relative motion, since the interface shear resistance is a component of that total resistance. As No. 2087985A reminds the reader, by providing such a bearing pad with a simple structure (as proposed in UK Pat. No. 2021705B, for example) which permits a degree of circulation of the pad fluid and avoids gross shearing between adjacent and oppositely-moving streams of that fluid, a zero gradient may replace the positive one and the total resistance be diminished. The invention of No. 2087985A lies in modifying that simple circulatory structure so that a negative pressure gradient is obtained in place of the zero one, so reducing the total resistance still further. The specification explains that in certain cases it might even be possible to diminish the total resistance of the bearing to zero.

The relevant teaching of both Application GB No. 2087985A and Pat. GB No. 2021705B is nevertheless confined to bearings, that is to say to structures which must not only permit relative movement between two members separated by a constant clearance, but must also provide the force necessary to maintain a constant relationship between points of reference on the two members at the bearing location during use when the two members are subject to a load, often a considerable and variable load, tending to cause the relationship to vary. In the case of the rotary bearing, that means primarily providing a resultant force that tends to hold the rotor to a constant axis of rotation. The present invention arises from not only appreciating that the invention of No. 2087985A is theoretically capable of reducing the total resistance of a load-carrying bearing beyond zero and into a negative function, but also and more surprisingly that the quantities involved are such as to have useful application for driving purposes not only in rotary structures superficially similar to bearings but also in other rotary structures also.

According to one aspect of the invention a fluid-powered rotary motor comprises a first and rotary member, adapted to rotate about an axis of rotation; a second member; said first and second members defining between them a narrow annular clearance; a source of pressurised fluid; a receptacle for discharged fluid; at least one inlet to, and at least one outlet from, said annular clearance; first conduit means connecting said source to said at least one inlet; said first conduit means and said inlet being arranged so as to present an axis of discharge for said fluid entering said annular clearance by way of them, said axis of discharge being angled so as not continuously to intersect said first member; second conduit means connecting said at least one outlet to said receptacle; said clearance and said at least one inlet and outlet being arranged in a manner lacking axisymmetry, whereby any hydrostatic force exerted upon said first member by said pressurised fluid when within said annular clearance tends to displace said axis of rotation, and said at least one inlet and outlet to said annular clearance being circumferentially displaced from each other relative to said axis of rotation, whereby in use said first member is driven in rotation substantially wholly by the hydrodynamic viscous drag upon it of said pressurised fluid travelling circumferentially within said annular clearance from a said inlet to a said outlet, without any significant contribution due to change in momentum of the fluid resulting from change of its direction on impact with the first member.

According to another aspect of the invention a fluid-powered rotary motor comprises a first and rotary member, adapted to rotate about an axis of rotation; a second member, said first and second members defining between them a narrow annular clearance; a source of pressurised fluid; a receptacle for discharged fluid; at least one inlet to, and at least one outlet from, said annular clearance; first conduit means connecting said source to said at least one inlet; said first conduit means and said inlet being arranged so as to present an axis of discharge for said fluid entering said clearance by way of them, said axis of discharge being angled so as not continuously to intersect said first member; second conduit means connecting said at least one outlet to said receptacle; at least one associated bearing to provide the balance of any support that said first member requires, in addition to any hydrostatic force exerted upon it by said pressurised fluid within said clearance in use, to maintain the alignment of said axis of rotation constant, and said at least one inlet and outlet to said annular clearance being circumferentially displaced from each other relative to said axis of rotation, whereby said first member is driven in rotation by the hydrodynamic viscous drag upon it of said pressurised fluid travelling circumferentially within said annular clearance from a said inlet to a said outlet, without significant contribution resulting from change in momentum of the fluid due to it changing direction on making impact with the first member.

At least one inlet and outlet may be formed in said second member.

The face of said second member defining said annular clearance may be formed with recesses, said at least one inlet and outlet being located within said recesses. The second member may be a stator and the first member may be a rotor and include a cylindrical shaft coaxial with said axis of rotation.

The cylindrical shaft may be formed with a part of enlarged diameter and at least one said recess may be formed in the part of said second member which confronts said enlarged part of said rotor across said annular clearance.

The surface of said first member may be profiled and the profiling may take the form of a plurality of axially-spaced circumferential grooves arranged in parallel with each other. Alternatively the profiling may take the form of helical grooving.

A plurality of said inlets may be connected to a common said source of pressurised fluid and there may be separate pressure-regulating devices connecting each of said inlets to said source of pressurised fluid.

The invention also includes a method of driving a fluid-powered rotary motor, comprising a rotor separated from a second part by a narrow annular clearance, in which fluid is introduced to that clearance through an inlet and travels circumferentially within the clearance before leaving it by way of an outlet, and in which the manner of the introduction of said fluid to said clearance by way of said inlet is such as to avoid any substantial jet-like impingement of said introduced fluid upon said rotor, whereby said rotor is driven in rotation substantially wholly by the hydrodynamic viscous drag upon it of said fluid moving circumferentially within said annular clearance.

The invention is also defined by the claims, the contents of which are to be deemed to form part of the disclosure of this specification, and the invention will now be described, by way of example, with reference to the accompanying drawings in which:

Figure 1:
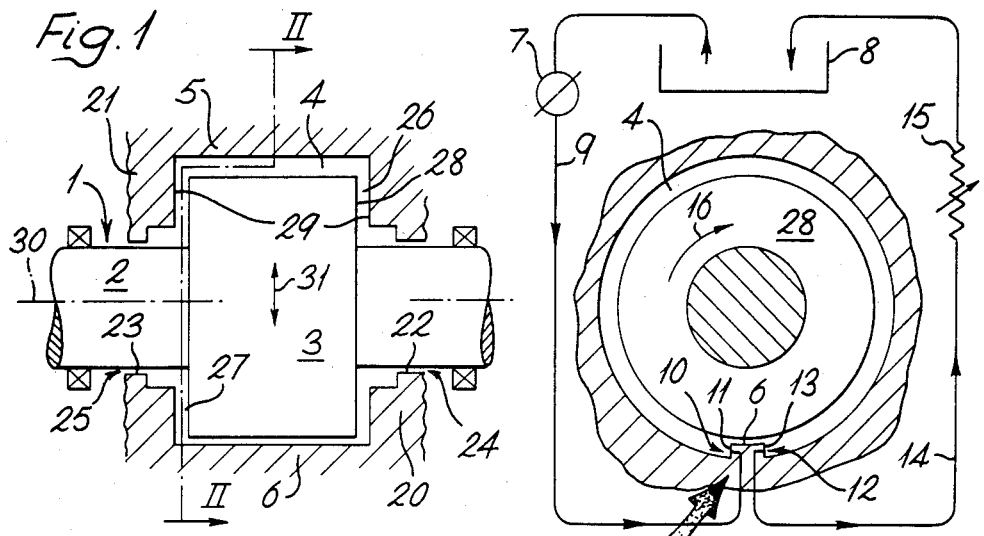
FIG. 1 is a diagrammatic radial section through one motor according to the present invention, showing associated fluid circuit components.
Figure 2:
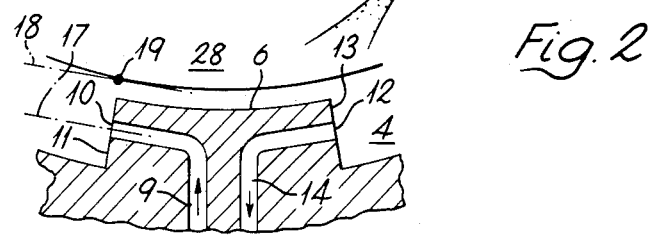
FIG. 2 is a section on the line II—II in FIG. 1, includes an extra fragmentary view on larger scale, and also shows associated load-supporting bearings.

The motor of FIGS. 1 and 2 essentially comprises two members. The first of these members is a rotor 1, comprising a shaft 2 formed with a part 3 of enlarged diameter. The second of these members is a housing 5, within which part 3 rotates. For the most part the clearance 4 between part 3 and the housing 5 is of circular section and coaxial with rotor 1 so that a uniform gap h separates the housing from the part 3, but the clearance is completed by a raised land 6 and the gap between the crest of this land and the part 3 is as small as is practicable. A pump 7 draws fluid from a reservoir 8 and delivers it by way of a hydraulic line 9 into clearance 4 by way of an inlet port 10 located in the leading face 11 of land 6. Fluid returns to reservoir 8 by way of an outlet port 12, which is located in the trailing face 13 of land 6 and which communicates with the reservoir by way of a hydraulic line 14 and variable resistance 15 which may be activated manually or by a servo system, or by a combination of such means. The direction of rotation of rotor 1 is represented by arrow 16, and in referring to faces 11 and 13 of land 6 as "leading" and "trailing" we refer to the order in which those faces are passed by any point on the circumference of part 3 as it crosses the mouth of clearance 4, the leading face being passed first. It is important to note, as the enlarged fragmentary part of FIG. 2 shows plainly, that the part of hydraulic line 9 immediately upstream of inlet port 10 lies in a circumferential plane relative to the axis of rotation 30 of the rotor 1, thus defining an axis of discharge (indicated by the broken line 17) for the fluid which enters the clearance 4 by way of inlet 10. Axis 17 lies substantially parallel to the tangent 18 at the nearest point 19 on the cylindrical surface of part 3 of rotor 1. There is thus no possiblity of direct jet impingement upon the rotor of the fluid that enters the clearance through inlet 10: instead, substantially the entire torque that that fluid exerts upon the rotor as it travels circumferentially around clearance 4 towards outlet port 12 is due to hydrodynamic viscous drag action.

In operation, when pressurised fluid is supplied from pump 7 to port 10, it travels clockwise around clearance 4 before leaving it by way of port 12, and as it travels thus the viscous drag that it exerts upon the surface of part 3 will cause the rotor to rotate provided certain conditions are satisfied in a way that will be described in the theoretical analysis that is to follow. The housing 5 extends axially beyond part 3 in both directions, and is formed with two inwardly-projecting flanges 20 and 21. The radially-innermost surfaces 22 and 23 of these flanges are separated from the surface of shaft 2 by small clearances 24 and 25. In use, fluid is supplied to clearance 4 by way of port 10 at such a rate that not all of the fluid so supplied leaves the clearance by way of port 12: the remainder will leave by way of clearances 24 and 25 having reached those clearances from clearance 4 by passing radially inwards through the communicating disc-shaped clearances 26, 27 separating the walls 28 of part 3 from the confronting walls 29 of flanges 20 and 21.

By locating clearances 24 and 25 at the relatively small radius of shaft 2, rather than against the greater radius of part 3, their circumferential length is minimised, as is the relative velocity of their confronting surfaces in use. This therefore minimises the resistance that they offer to the rotation of the rotor by reason of shearing within the fluid that is constantly passing through them.

It will readily be appreciated that while the structure so described is capable of acting as a motor to cause rotor 1 to rotate within housing 5, it is not capable of acting as a bearing to hold the rotor axis 30 stationary while rotation takes place. The presence of only a single land 6 will cause the fluid within clearance 4 and also within clearances 26 and 27, to exert a net radial hydrostatic thrust tending to displace axis 30 in the direction of arrow 31. Separate bearings, shown diagrammatically in FIG. 1, must therefore be provided to support the rotor 1 as it is driven. These bearings may, for example, be of the kind described in UK Pat. No. 2021705B.

Figure 3:
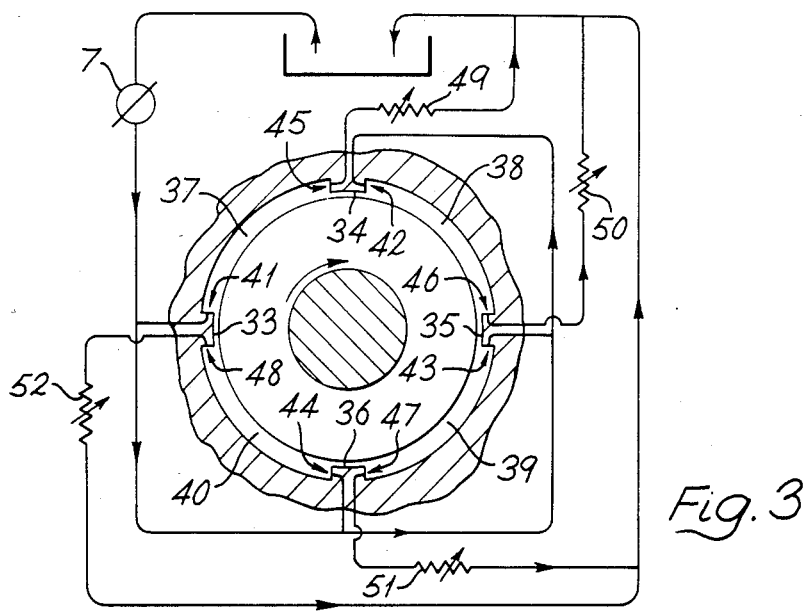
FIG. 3 is a view similar to that of FIG. 1, through another form of motor.

The alternative apparatus shown in FIG. 3 comprises not a single land but four lands 33-36 equi-spaced around part 3 and located in a common radial plane relative to axis 30. The clearance between rotor and housing now includes four shallow recesses 37-40 bounded by the housing, the rotor and the adjacent lands. These recesses are supplied with fluid from pump 7 by way of inlet ports 41-44, and discharge back to reservoir 8 by way of outlet ports 45-48 and separate, independently-variable resistors 49-52. As with the motors of FIGS. 1 and 2, the housing 5 may extend axially to either side of the enlarged part 3 of the rotor and may be shaped so that recesses 37-40 communicate with disc-shaped clearances (such as 26 and 27) separating the part 3 from flange-shaped parts of the housing (such as 20 and 21). The shaft 2 of the motor of FIG. 3 may again require further bearings (such as 32, FIG. 1) to provide or at least complete the support of the rotor.

Figure 4:
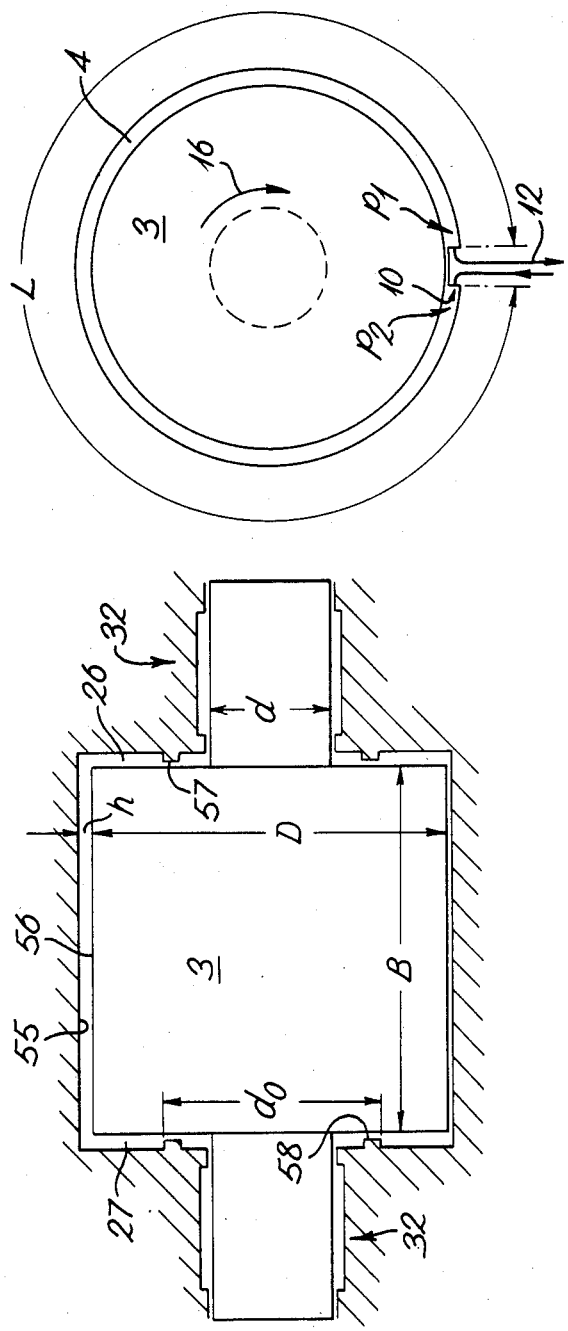
FIG. 4 is a schematic and shows the motor of FIG. 1 in both radial and axiial section with associated velocity diagrams, to illustrate the theoretical analysis that follows shortly.
Figure 5:
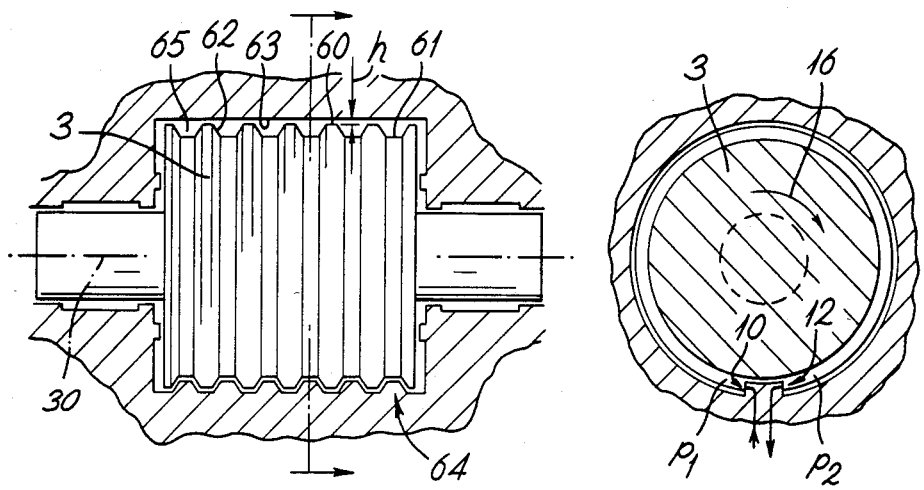
FIGS. 5 and 6 show the rotors of two further alternative motors in outline, each Figure including both an axial and a radial section.
Figure 6:
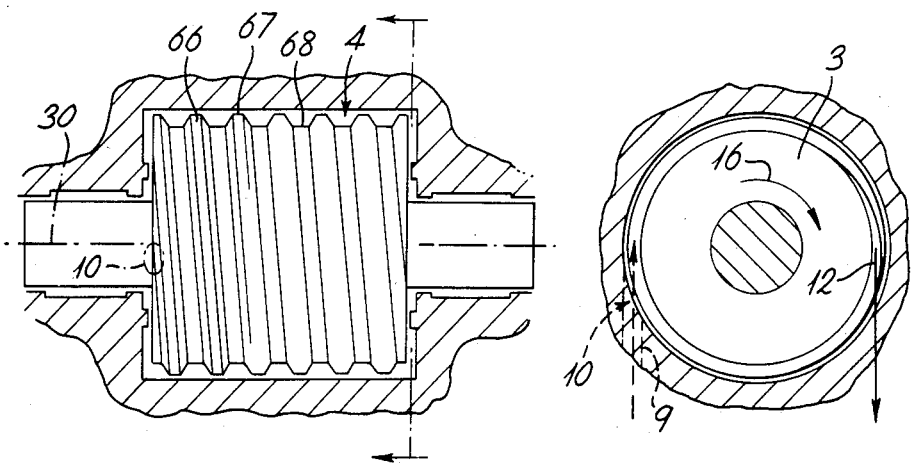

The rotor 1 of FIG. 5 differs from that of FIGS. 1 to 4 in that the surface of enlarged part 3 is not straight when viewed in axial section but is grooved and comprises crests 60 and troughs 61 joined by walls 62 which may be sloping as shown but also of other configurations. The clearance between the crests 60 and the inner wall 63 of housing 5 is small, and the working clearance (dimension h) of the motor is between wall 63 and troughs 61. Land 64, the equivalent of the land 6 of FIGS. 1 and 2, is of serrated shape to match crests 60 and troughs 61. The working space of the motor thus comprises a plurality of separate, axially-spaced channels 65. From comparison of the two sections of FIG. 5 it will be apparent that the ports 10 and 12 of the motor are aligned, relative to the axis of rotation 30, with one of the channels 65, so that as shown in the large-scale fragment of FIG. 2 the axis of discharge 17 of fluid from a port 10 is tangential relative to axis 30 and lies within a channel 65, without intersecting the structure of part 3 of the rotor. When the apparatus is working, if n is the number of channels, q is the flow in each channel and $\Delta p$ is the pressure drop (between ports 10 and 12) across each channel, then the total pressure drop across all the channels is still $\Delta p$ but the total flow is nq, because the individual channels are connected in parallel. Such a motor therefore has a high flow, low pressure drop characteristic. In constrast the rotor 1 of FIG. 6 is formed with a single-start thread 66 (a multi-start variant would also be possible), there is no land 64 but inlet port 10 is located a one axial end of the inner wall 63 of housing 5 and outlet port 12 is formed at the axially-opposite end. As in FIG. 5, the clearance between wall 63 and the crest 67 of the thread is small, and the working clearance h is between wall 63 and the trough 68. Also, inlet port 10 is tangential so that the fluid entering through it essentially enters directly into the clearance space between the rotor and the housing, and only intermittently impinges at all upon the thread 66. In operation, fluid entering clearance 4 by way of port 10 travels down trough 68 to reach port 12, completing several revolutions about the rotor axis and driving the rotor by viscous drag as it does so. The total flow will now simply be q but if the pressure drop experienced by the fluid in completing one revolution is p, the total drop between ports 10 and 12 will be Np where N is the number of revolutions the fluid completes: this motor therefore has a low flow, high pressure drop characteristic. The motors of FIGS. 5 and 6 of course have the common feature that their rotors present an enhanced surface area compared with the plain rotor of FIGS. 1 to 3, and thus the potential of enhanced drive effect by viscous drag.

The essential mechanism of the present invention is that the pressure drop, which a viscous fluid undergoes when passing through a narrow clearance, creates shear stresses upon the bounding surfaces of that clearance and thus imparts driving torques to them if they are capable of moving. In the analysis that follows, the symbols used indicate the following quantities in respect of the apparatus shown in FIG. 4:

v: Circumferential velocity of fluid at chosen point with clearance 4.
V: Circumferential velocity of part 3 of rotor 2.
h: Radial dimension of clearance 4.
y: Radial co-ordinate of chosen point within fluid within clearance 4. Value y=0 occurs at wall 55 of housing 5 surrounding part 3, and value increases as radius decreases.
x: Circumferential co-ordinate of chosen point within fluid clearance 4. Value x=0 occurs at leading face 11.
$\mu$: Fluid viscosity.
p: Fluid pressure.
$p_2$: Value of p at port 10.
$p_1$: Value of p at port 12.
L: Circumferential length of clearance 4 between ports 10 and 12.
$\tau$: Shear stress on the circumferential surface 56 of part 3.
T: Total torque.
$T_1$: Torque exerted upon circumferential surface 56 of part 3.
$T_2$: Torque exerted upon one of the axial end walls 28 of part 3.
B: Axial dimension of part 3.
D: Diameter of part 3.
A: Product of B and L.
N: Speed of rotor 1 in revolutions per minute.
$W_o$: Power delivered by fluid to circumferential area A of part 3.
$W_i$: Power of pump 7, required to deliver $W_o$.
$\eta$: Drive efficiency ($=W_o/W_i$).
d: Diameter of shaft 2.
$d_o$: Outer diameter of axially-facing lands 58, 57.
$x_1$: Radial co-ordinate of chosen point within clearances 26, 27.

The apparatus shown schematically in FIG. 4 is theoretically comparable with that shown in FIGS. 1 and 2 but with the practical difference, to simplify the analysis that follows, that the inner radial boundary of the circulating fluid is set not by clearances 24, 25 against the shaft 2 but by circular lands 57, 58 mounted on the axially-facing walls 29 of flanges 20 and 21, and defining an outer diameter of value $d_o$.

Referring to the velocity diagram at the foot of FIG. 4 we see that the resultant velocity, in a circumferential sense, of a particle of fluid at co-ordinates (x, y) within clearance 4 is made up of a drag flow component whose maximum value is related to V and which occurs adjacent the surface of part 3, and both positive and negative components related to the overall pressure difference ($p_2-p_1$) under which the fluid moves between ports 10 and 12. Both of these components present parabolic profiles with minimum values adjacent the radial extremities of clearance 4 and maximum values at the mid-radius.

It may be shown that:

$$v = V\frac{y}{h} - \frac{h^2}{2\mu} \cdot \left(\frac{y}{h} - \frac{y^2}{h^2}\right) \frac{dp}{dx}, \text{ and hence that}$$

$$\frac{dv}{dy} = \frac{V}{h} - \frac{h^2}{2\mu} \cdot \left(\frac{1}{h} - \frac{2y}{h^2}\right) \frac{dp}{dx}$$

for y=h. Also that $$\left|\frac{dv}{dy}\right|_{y=h} = \frac{V}{h} - \frac{h^2}{2\mu}\left(\frac{1}{h} - \frac{2}{h}\right)\frac{dp}{dx}$$

$$= \frac{V}{h} - \frac{h}{2\mu} \cdot \frac{(p_2 - p_1)}{L}.$$

Therefore for the clearance 4, that is to say the annular-section clearance between wall 55 and surface 56, the shear stress on the shaft surface:

$$|\tau|_{y=h} = -\mu \left|\frac{dv}{dy}\right|_{y=h} = \frac{h}{2} \cdot \frac{(p_2 - p_1)}{L} - \frac{\mu V}{h}, \text{ and}$$

Torque $T_1$ resulting from such shear stress:

$$= \tau A \cdot \frac{D}{2}, \qquad (1)$$

$$= A\frac{D}{2} \cdot \left[\frac{h}{2} \cdot \frac{(p_2 - p_1)}{L} - \frac{\mu V}{h}\right]$$

$$= \frac{1}{4} DBL \left[\frac{h}{L} \cdot (p_2 - p_1) - 2\frac{\mu V}{h}\right]$$

Therefore the power $W_o$ delivered by drive from this part of the fluid passage $$= T_1 \cdot \frac{2\pi N}{60} = T_1 V \cdot \frac{2}{D} \qquad (2)$$

$$= \frac{1}{2} BL \cdot V \left[\frac{h}{L} \cdot (p_2 - p_1) - 2\frac{\eta V}{h}\right].$$

and the pumping power $W_i$ required to deliver such power $$= (p_2 - p_1)^2 \cdot \frac{Bh^3}{12 \mu L} \qquad (3)$$

and the drive efficiency $$\eta = 6\epsilon(1 - 2\epsilon) \qquad (4)$$

where $$\epsilon = \frac{L}{h} \cdot \frac{(\mu V/h)}{(p_2 - p_1)}$$

Now for clearance 26 and 27, $$\tau x_1 = \frac{h}{2} \cdot \frac{(p_2 - p_1)}{2\pi x_1} - \frac{\mu V(2x_1/D)}{h}, \text{ and}$$

Torque $T_2$ delivered by each of these clearances $$= \int_{d_o/2}^{D/2} \tau x_1 \cdot 2\pi x_1 \cdot dx_1$$

Therefore $$T_2 = \int_{d_o/2}^{D/2} \frac{h}{2} \cdot (p_2 - p_1) x_1 dx_1 - \int_{d_o/2}^{D/2} \frac{4\mu V}{h} \cdot \frac{\pi}{D} x_1^3 dx_1 \qquad (5)$$

$$= \frac{h}{16} \cdot (p_2 - p_1)(D^2 - d_o^2) - \frac{\pi}{16}\left(\frac{\mu V}{h}\right)\frac{1}{D}(D^4 - d_o^4)$$

From (1) and (5), the total torque T delivered by the drive=

$$T = T_1 + 2T_2 \qquad (6)$$

$$= \frac{\pi}{4} D^2 B \left[\frac{h}{D\pi} \cdot (p_2 - p_1) - 2\frac{\mu V}{h}\right] +$$

$$\frac{h}{8} \cdot (p_2 - p_1) \cdot (D^2 - d_o^2) - \frac{\pi}{8}\left(\frac{\mu V}{h}\right) \cdot \frac{1}{D}(D^4 - d_o^4)$$

$$= D^3 \left[\frac{1}{8} \frac{h}{D}\left(1 + 2\frac{B}{D} - \frac{d_o^2}{D^2}\right) \cdot (p_2 - p_1) - \right.$$

$$\left. \frac{\pi}{8} \cdot \left(1 + 4\frac{B}{D} - \frac{d_o^4}{D^4}\right) \frac{\mu V}{h}\right]$$

A design study, based on the foregoing analysis, has been undertaken for a drive capable of running at N=20,000 and developing 20 HP, and in which:

d=2 inches
$d_o$=3 inches
D=3 inches
B=6 inches
h=0.015 inches
$\mu$=0.35×10$^{-5}$ reyns.

Assuming 75% of theoretical efficiency is attainable, this study has shown that total torque T=121.5−0.0198 V lb.in can be achieved, the quantity V here being expressed in inches per second, that the resistance offered by clearance 4 to the passage of fluid between ports 10 and 12 is of the order of 19.55 lb.sec/in$^5$, and that a fluid flow rate of about 19.75 gallons per minute and a pumping power ($W_i$) of about 25 HP are required.

I claim:
1. A fluid powered rotary motor, comprising:
   a first and rotary member, adapted to rotate about an axis of rotation, presenting opposite first and second axial ends and formed with a helical thread;
   a second member;

said first and second members and said thread defining between them a narrow helical clearance coaxial with said axis and extending in a spiral from said first to said second axial end of said first member with a first sense of rotation relative to said axis;

a source of pressurized fluid;

at least one inlet to said helical clearance, disposed tangentially relative to said clearance and located at said first axial end of said first member, said inlet being connected to said source whereby fluid entering said clearance through said inlet from said source does so with a second sense of rotation relative to said axis;

at least one outlet from said helical clearance, disposed tangentially relative to said axis and located at said second axial end of said first member, whereby fluid leaving said helical clearance by way of said outlet does so with a third sense of rotation relative to said axis;

said first, second and third senses of rotation relative to said axis being the same, whereby fluid passing through said motor between said inlet and said outlet travels down said helical clearance and in so doing causes said rotary member to rotate by reason of the hydrodynamic viscous drag exerted upon it by said fluid.

* * * * *